United States Patent [19]
Flajole

[11] 3,743,317
[45] July 3, 1973

[54] PASSENGER SAFETY DEVICE

[76] Inventor: William J. Flajole, 20650 Breezewood, Southfield, Mich.

[22] Filed: Feb. 10, 1971

[21] Appl. No.: 114,232

[52] U.S. Cl. ................................. 280/150 B
[51] Int. Cl. ................................. B60r 21/02
[58] Field of Search .............. 280/150 B; 296/84 K; 297/216, 384, 390; 244/122 R, 122 AG

[56] References Cited
UNITED STATES PATENTS

| | | | |
|---|---|---|---|
| 3,279,817 | 10/1966 | Henry | 280/150 B |
| 2,933,343 | 4/1960 | Potts | 280/150 B X |
| 2,904,122 | 9/1959 | Nordrum et al. | 280/150 B X |
| 2,813,749 | 11/1957 | Wetig | 296/84 K UX |
| 2,749,143 | 6/1956 | Chika | 280/150 B |
| 3,095,170 | 6/1963 | Harb | 297/216 X |
| 3,424,497 | 1/1969 | Brilmyer et al. | 297/384 X |
| 3,494,633 | 2/1970 | Malloy | 280/150 B |
| 3,524,678 | 8/1970 | Lavenne | 280/150 B X |
| 2,923,559 | 2/1960 | Owens | 280/150 B |

FOREIGN PATENTS OR APPLICATIONS

| | | | |
|---|---|---|---|
| 957,548 | 8/1956 | Germany | 280/150 B |
| 1,003,534 | 9/1965 | Great Britain | 280/150 B |
| 897,053 | 11/1953 | Germany | 280/150 B |

*Primary Examiner*—Richard J. Johnson
*Assistant Examiner*—Robert R. Song
*Attorney*—Harness, Dickey & Pierce

[57] ABSTRACT

A safety device effective as a passive resistance system for the passenger in the front seat of an automobile is formed as a hood-like element which is pivoted at the bottom and weighted to pivot upwardly to cover the windshield when not in use to cut off the forward vision of the passenger. This forces the passenger to pull the hood down over his lap after he sits on the passenger seat. The device will swing up to cover the windshield on impact or will function as a seat belt to retain the passenger in the seat when an impact occurs.

6 Claims, 4 Drawing Figures

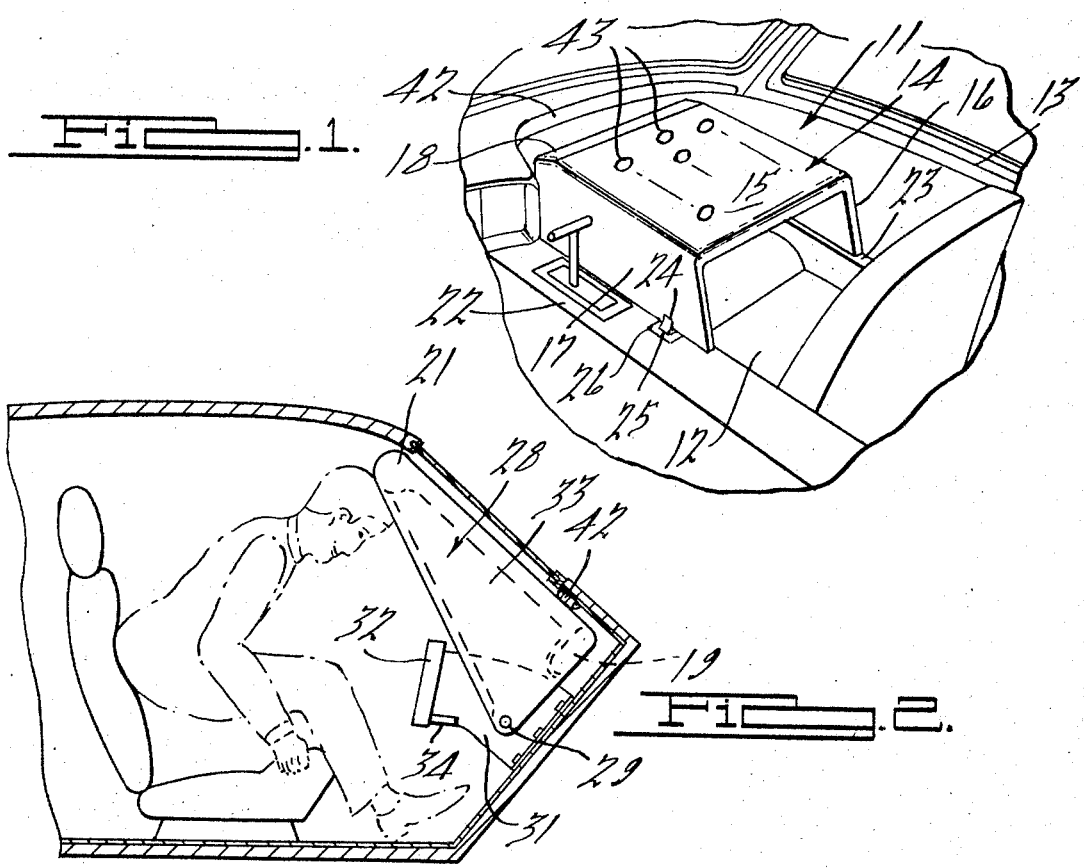
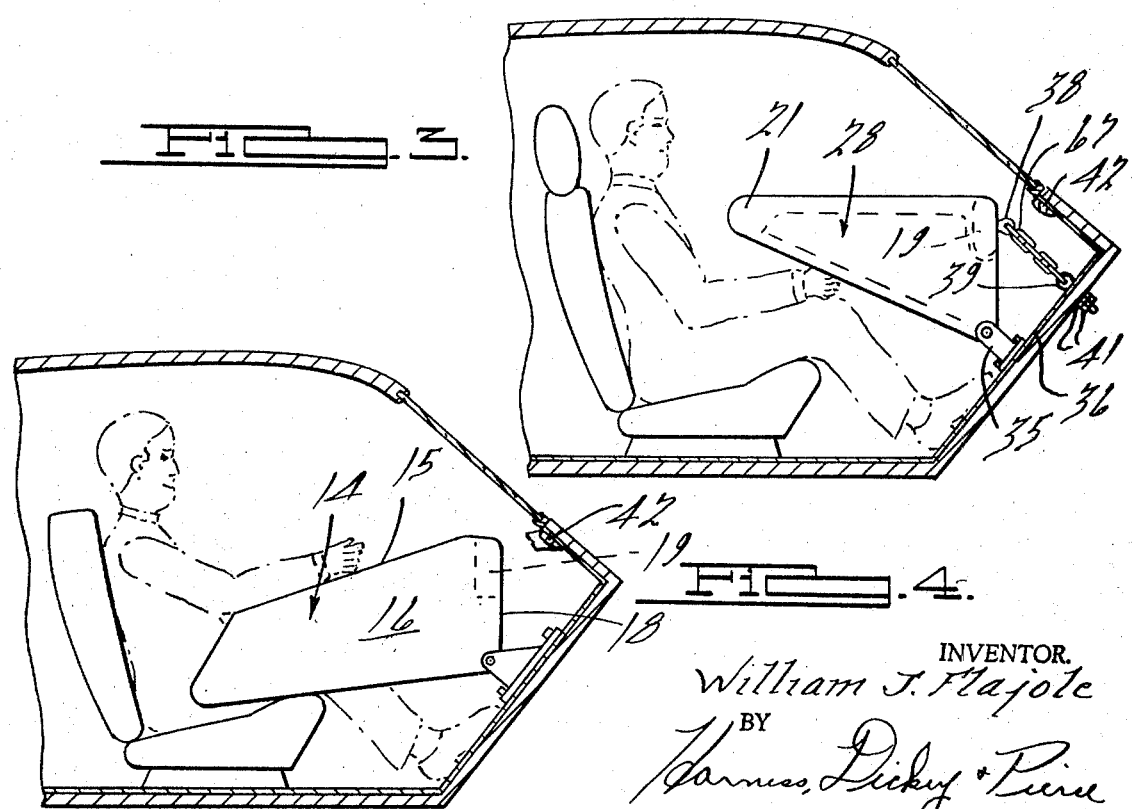

PASSENGER SAFETY DEVICE

SUMMARY OF THE INVENTION

The invention pertains to a passive resistance device for protecting the occupant in the front passenger seat which is formed as a hood having a front, bottom and two side walls. The forward side edges of the bottom are pivoted to the floor or fire wall and the forward end thereabove is weighted to cause the hood to move to erect position when not in use or when subjected to a force resulting from an impact. When in erected position, the top wall of the hood covers the windshield to protect the passenger from being through forward thereagainst and to obstruct his view when seated so that the hood must be pulled down to protect the occupant. The hood may be suspended above the lap of the occupant free to move forward to cover the windshield at the time of impact so that any forward movement of the occupant will be absorbed by the cushioning material provided over and about the edges of the hood.

In another form of the invention, the hood rests upon the seat or is otherwise supported to cover the lap and the sides of the occupant to be retained in this position upon impact so that the occupant will be held in seated position when an impact occurs. This provides a support similar to a seat belt with no option as to whether or not it should be used since it must be pulled down in safety position to permit the occupant to see ahead through the windshield. A locking element may be provided for retaining the hood in body-covered position so that it can lock a child or an invalid in the seat or can be retained in protected position so that when the seat is unoccupied the driver can see through all portions of the windshield.

BRIEF DESCRIPTION OF THE DRAWING

FIG. 1 is a broken perspective view of a passenger seat of an automobile having a hood of the present invention applied thereto;

FIG. 2 is a sectional view of an automobile showing a protective hood in windshield-covered position against which the impact of the occupant's forward movement is absorbed;

FIG. 3 is a view of structure, similar to that illustrated in FIG. 2, with the hood in normal driving position, and FIG. 4 is a side view of structure similar to that illustrated in FIG. 1, with the body in section and the passenger seat occupied showing a slightly different form of the invention.

DESCRIPTION OF THE PREFERRED EMBODIMENTS

In FIGS. 1 and 4, a passive resistance device 11 is illustrated in passenger-protective position when disposed over a seat cushion 12 in the passenger side of an automobile 13. The passive resistance device 11 is in the form of a hood 14 having a top wall 15, side walls 16 and 17 and a forward wall 18. The hood 14 is of light weight made from foamed plastic with the top portion of the forward wall 18 having a weight 19 applied thereto. This may be shot in a container or a bar of metal, ceramic material or the like. The top and side edges of the hood have a padding 21 of foamed plastic to provide further protection along the edges of the hood. The hood is shown in FIG. 1 as having the side 17 resting upon a console 22 and the edge of the side 16 resting upon a ledge 23 on the automobile door. In FIG. 4 the sides of the hood rest upon the forward edge of the passenger seat or the passenger side thereof. With this arrangement, the front and sides of the occupant's body are protected against impact and the arms of the occupant can rest upon the top wall 15 of the hood providing maximum protection as well as comfort. The hood of either FIG. 1 or FIG. 4, which differs only in shape and not function, operate as a seat belt preventing the body of the occupant from being thrown forward upon impact but with the added feature of forcing the occupant to employ the passive resistance device since he must move it to projecting position so as to see through the windshield. When the car is driven without an occupant, the driver can lock the hood 15 in protected position by turning a latch member 24 that passes through a slot 25 in a plate 26 carried by the side 17 of the hood 14, illustrated in FIG. 1. The locking of the hood in this position permits the driver to see through the entire width of the windshield and adds further protection to a child or an invalid who is occupying the passenger seat. When the seat is not occupied, the weight 19 retains the hood in erect position with the top wall 15 covering the windshield section on the passenger side thereof. The covering of the windshield forces the passenger when occupying the seat to move the hood down and retain it in protective position, as illustrated in FIG. 4. When in the down position the lower portion of the body is enclosed by a hood and heat will collect thereunder. A plurality of apertures 43 through the hood permits air circulation and provides comfort to the occupant.

Another form of the invention is illustrated in FIG. 2 wherein a hood 28 is secured by pivots 29 to a container 31 which could be constructed in the same manner as a glove box having a pivoted padded door 32. The side walls 33 of the hood 28 in the downward position thereof rests upon projecting arms 34 extending outwardly from the forward bottom portion of the container. This retains the hood above the lap of the occupant in position to have the weight 19 thereof move the hood into erect position over the windshield upon impact. This will occur prior to the forward movement of the occupant's body so that, instead of striking the windshield, the hood will take the body impact.

A similar form of structure is illustrated in FIG. 3, wherein the hood 28 is pivoted on a pair of brackets 35 which are secured to the floor or the forward fire wall 36 of the automobile. While various means may be provided for limiting rearward tilting movement of the hood, a chain 37 is herein illustrated which may be secured between an eye 38 on the hood and that of an eyebolt 39 which is adjustably secured to the fire wall by a pair of nuts 41. The hood of FIG. 3 functions in the same manner as that of FIG. 2 being swung to erect position to cover the windshield immediately upon impact before the occupant's body moves forwardly thereagainst.

The novelty in all of the constructions illustrated is that of providing a passive resistance device which is foolproof and which must be used by the occupant, otherwise, his vision through the windshield would be interrupted. The device may function as a seat belt to limit the forward movement of the body upon impact or which may be mounted in a manner to have it move forwardly against the header at the top of the windshield to prevent the occupant from striking the header or windshield when the body is thrown forwardly.

While the use of the seat belt is optional with the seat occupant, the device of the present invention must be moved to protective position, otherwise, the occupant's vision is cut off. The instrument panel which usually extends across the entire front of the automobile is interrupted at the passenger side so that the hood 14 or 28 will be free to swing to the erect position to cover the windshield. The A pillars are connected by reinforcing members 42 which extend between the pillars beneath the windshield. This provides strength to the cowl and windshield and transverse reinforcement between the pillars.

I claim:

1. In a passive resistance device for the front passenger seat of an automobile body having the dash panel section forwardly thereof recessed, a hood-like element of inverted U-shape having a top and two side walls, means for pivoting the front bottom corners of the side wall to the body for movement from erect position within said recess covering a portion of the windshield to a position above the seat encompassing the lower extremity of the occupant, and weight means carried by the hood above the pivoting means for retaining the hood in erect position to cover at least a portion of the passenger side of the windshield when the seat is unoccupied.

2. In a passive resistance device as recited in claim 1, wherein locking means is provided for optionally securing the hood in protective position over the seat.

3. In a passive resistance device as recited in claim 1, wherein the hood moves to a position directly over the lap of the occupant so that the arms can rest on the top wall thereof with the rearward edge of the top portion retaining the occupant against any substantial forward movement upon impact in the manner of a seat belt.

4. In a passive resistance device as recited in claim 1, wherein apertures are provided through the hood for ventilating the under portion thereof.

5. In a passive resistance device as recited in claim 1, wherein the bottom of the side walls of the hood are substantially on the level with the top of the seat so as to protect the occupant when a side impact occurs.

6. In a passive resistance device as recited in claim 1, wherein the U-shaped hood is constructed from a durable foamed material having padding about the edges of the side and top walls.

* * * * *